(12) United States Patent
Deutsch et al.

(10) Patent No.: US 9,764,739 B2
(45) Date of Patent: Sep. 19, 2017

(54) TRANSMISSION AND INTEGRATED TRANSFER CASE

(71) Applicant: Ford Global Technologies, LLC, Southfield, MA (US)

(72) Inventors: Laurence Andrew Deutsch, Farmington Hills, MI (US); Jeffrey Edward Maurer, Commerce, MI (US); Steven Anatole Frait, Milan, MI (US); Nicholas E. McCubbin, Northville, MI (US); Andreas E. Perakes, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 14/552,845

(22) Filed: Nov. 25, 2014

(65) Prior Publication Data
US 2016/0144864 A1   May 26, 2016

(51) Int. Cl.
*B60W 30/18* (2012.01)
*F16H 57/04* (2010.01)
(Continued)

(52) U.S. Cl.
CPC ...... *B60W 30/18181* (2013.01); *B60W 10/10* (2013.01); *B60W 10/119* (2013.01);
(Continued)

(58) Field of Classification Search
CPC ......... B60W 30/18181; B60W 10/119; B60W 10/10; B60W 30/18172;
(Continued)

(56) References Cited

U.S. PATENT DOCUMENTS 5,115,887 A  *  5/1992  Smith ................. F16H 57/0447
                                                  184/6.12
5,704,863 A     1/1998  Zalewski et al.
(Continued)

FOREIGN PATENT DOCUMENTS

| CN | 2926670 Y | 7/2007 |
| CN | 201158308 Y | 12/2008 |
| EP | 0876933 A2 | 11/1998 |

*Primary Examiner* — David J Hlavka
(74) *Attorney, Agent, or Firm* — James Dottavio; Brooks Kushman P.C.

(57) ABSTRACT

A transfer case and transmission are designed to permit the transmission hydraulic control system to control a range selection coupler and a torque on demand clutch in the transfer case. Two pressure circuits are transmitted from the transmission to the transfer case: a high range circuit and a low range circuit. The low range circuit is pressurized to engage low range while the range circuit is pressurized to engage high range. The torque on demand clutch is controlled by whichever of these circuits has the higher pressure. Lubrication is provided to a front section of the transfer case via the transmission output shaft, with the fluid returning to the transmission sump through a drainback passageway. The rear portion of the transfer case has a segregated sump. A control strategy is employed to partially fill front section of the transfer case with fluid in preparation for vehicle towing.

11 Claims, 8 Drawing Sheets

(51) Int. Cl.
*B60W 10/119* (2012.01)
*B60W 10/10* (2012.01)
*F16H 61/70* (2006.01)
*B60K 17/344* (2006.01)

(52) U.S. Cl.
CPC ... *B60W 30/18172* (2013.01); *F16H 57/0412* (2013.01); *F16H 57/0435* (2013.01); *F16H 57/0439* (2013.01); *F16H 57/0441* (2013.01); *F16H 57/0445* (2013.01); *F16H 57/0446* (2013.01); *F16H 57/0482* (2013.01); *F16H 61/702* (2013.01); *B60K 17/344* (2013.01); *B60W 2520/26* (2013.01); *B60W 2710/1083* (2013.01)

(58) Field of Classification Search
CPC ...... B60W 2710/1083; B60W 2520/26; B60K 17/344; F16H 57/0445; F16H 57/0435; F16H 57/0439; F16H 57/0482; F16H 57/0441; F16H 57/0446; F16H 57/0412
See application file for complete search history.

(56) References Cited

U.S. PATENT DOCUMENTS

| | | | |
|---|---|---|---|
| 6,251,045 B1* | 6/2001 | Oliveira | B60W 30/1819 475/303 |
| 6,278,927 B1* | 8/2001 | Fox | F16H 61/12 477/154 |
| 6,341,552 B1 | 1/2002 | Potter et al. | |
| 6,662,684 B1 | 12/2003 | Krisher | |
| 6,997,299 B2* | 2/2006 | Brissenden | B60K 23/0808 180/248 |
| 7,435,199 B2 | 10/2008 | Showalter | |
| 8,579,094 B2 | 11/2013 | Moorman et al. | |
| 2003/0085062 A1* | 5/2003 | Bowen | B60K 6/365 180/65.1 |
| 2005/0160728 A1* | 7/2005 | Puiu | B60K 17/3462 60/435 |

* cited by examiner

TRANSMISSION AND INTEGRATED TRANSFER CASE

TECHNICAL FIELD

This disclosure relates to the field of vehicle transfer cases and associated hydraulic controls. More particularly, the disclosure pertains to a transfer case and an automatic transmission that share a common hydraulic control system.

BACKGROUND

In a typical rear wheel drive powertrain, an internal combustion engine converts chemical energy into mechanical energy to rotate a shaft and a transmission adapts the speed and torque of the shaft to suit vehicle requirements. At slow vehicle speed, the transmission reduces the speed and multiplies the torque to improve acceleration. At cruising speeds, the transmission increases the speed allowing the engine to operate at a fuel efficient operating speed. Power is transferred from the transmission output to the vehicle wheels via a rear driveshaft, a rear differential, and rear axle shafts. The transmission may be an automatic transmission which establishes one of a fixed number of available power flow paths by engaging particular friction clutches. The clutches may be engaged by supplying pressurized fluid through a hydraulic control system.

To improve traction, it is advantageous to be able to transmit power to all four vehicle wheels. To accomplish this, a transfer case mounted to the transmission may distribute power from the transmission output to the rear driveshaft and also to a front driveshaft that drives the front wheels via a front differential and front axle shafts. Many transfer cases include a torque on demand (TOD) clutch that selectively transfers power to the front driveshaft. Typically, control of the TOD clutch is independent of the transmission clutches.

Many transfer cases also include a low range and a high range to provide added vehicle functionality. Control of the coupler that selects the desired range is also typically independent of the transmission clutches. Some transfer cases are also capable of selecting a neutral position in which the front and rear driveshafts are not coupled to the transmission output. This is useful for towing the vehicle because movement of the vehicle results in rotation of the front and rear driveshafts. However, since some transfer case components still rotate, proper lubrication of those components is still required during towing.

SUMMARY OF THE DISCLOSURE

A vehicle powertrain includes an automatic transmission and a transfer case. The automatic transmission transmits power from a transmission input shaft to a transmission output shaft at a variety of speed ratios. The transmission has a hydraulic control system having a high range circuit and a low range circuit. The transfer case is mounted to the transmission and transmits power from the transmission output shaft to a rear driveshaft. The transfer case operates in high range in response to fluid pressure in the high range circuit and operates in low range in response to fluid pressure in the low range circuit. The transfer case may also include a torque on demand clutch that selectively transfers power from the transmission output shaft to a front driveshaft in response in the high range circuit or low range circuit, whichever is greater. The hydraulic control system may also include a lubrication circuit routed from the transmission to the transfer case and a drainback passageway from a transfer case front sump to the transmission sump. A drainback valve may selectively block the drainback passageway.

A transmission hydraulic control system includes a high range circuit, a low range circuit, a pressure control valve, and a switch valve. The high range circuit and low range circuit are each adapted to transmit fluid across an interface to a transfer case. The pressure control valve adjusts a pressure in a controlled pressure circuit based on a first electrical current. The switch valve alternately connects the controlled pressure circuit to either the high range circuit or the low range circuit.

A transfer case includes a high range circuit, a low range circuit, and a coupler. The high range circuit and low range circuit are each adapted to receive fluid across an interface from a transmission. The coupler establishes an underdrive speed relationship between a transmission output shaft and a driveshaft in response to fluid pressure in the low range circuit and a direct drive speed relationship in response to fluid pressure in the high range circuit.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
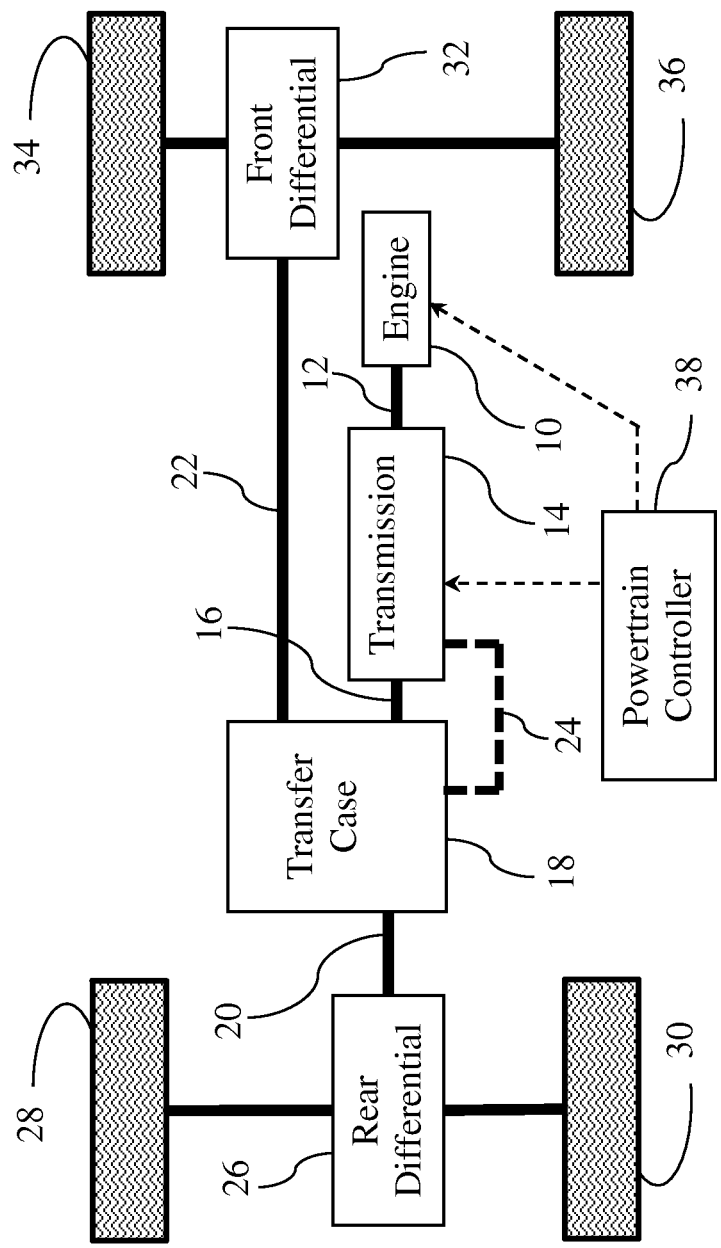
FIG. 1 is a schematic diagram of a vehicle powertrain.

FIG. 1 schematically illustrates a four wheel drive vehicle powertrain. Solid lines indicate shafts capable of transferring torque and power. Engine 10 converts chemical energy in the fuel into mechanical power which is delivered to transmission input shaft 12. Transmission 14 modifies the speed and torque to suit vehicle requirements and delivers the power to transmission output shaft 16. Transfer case 18 drives rear driveshaft 20 and front driveshaft 22. The transfer case alternately operates in a high range mode in which the front and rear driveshafts are driven at the same speed as the transmission output shaft or in a low range mode in the which the front and rear driveshafts are driven at a speed substantially slower than the transmission output shaft. Bold dotted line 24 indicates a flow of hydraulic fluid at various pressures between transmission 14 and transfer case 18. Rear differential 26 distributes power from the rear driveshaft 20 to a left rear wheel 28 and a right rear wheel 30. The differential provides approximately equal torque to each wheel while permitting slight speed differences as the vehicle turns a corner. Rear differential 26 may include a hypoid gear which changes the axis of rotation and reduces the speed by a final drive ratio. Similarly, front differential 32 distributes power from the front driveshaft 22 to a left front wheel 34 and a right front wheel 36.

Powertrain controller 38 adjusts the power produced by engine 10 and the state of transmission 14 and transfer case 18 based on signals from various sensors. The sensors may include a gear selector (PRNDL), a transfer case range selector, a brake pedal, and an accelerator pedal that are manipulated by the driver. Powertrain controller 38 may also use signals from other types of sensors such as speed sensors, torque sensors, pressure sensors, temperature sensors, etc. As discussed in detail below, the state of transfer case 18 is manipulated by sending electrical signals to transmission 14 which produce changes in the hydraulic pressures in hydraulic circuits 24. The powertrain controller may be a single microprocessor or may be a network of communicating microprocessors.

Figure 2:
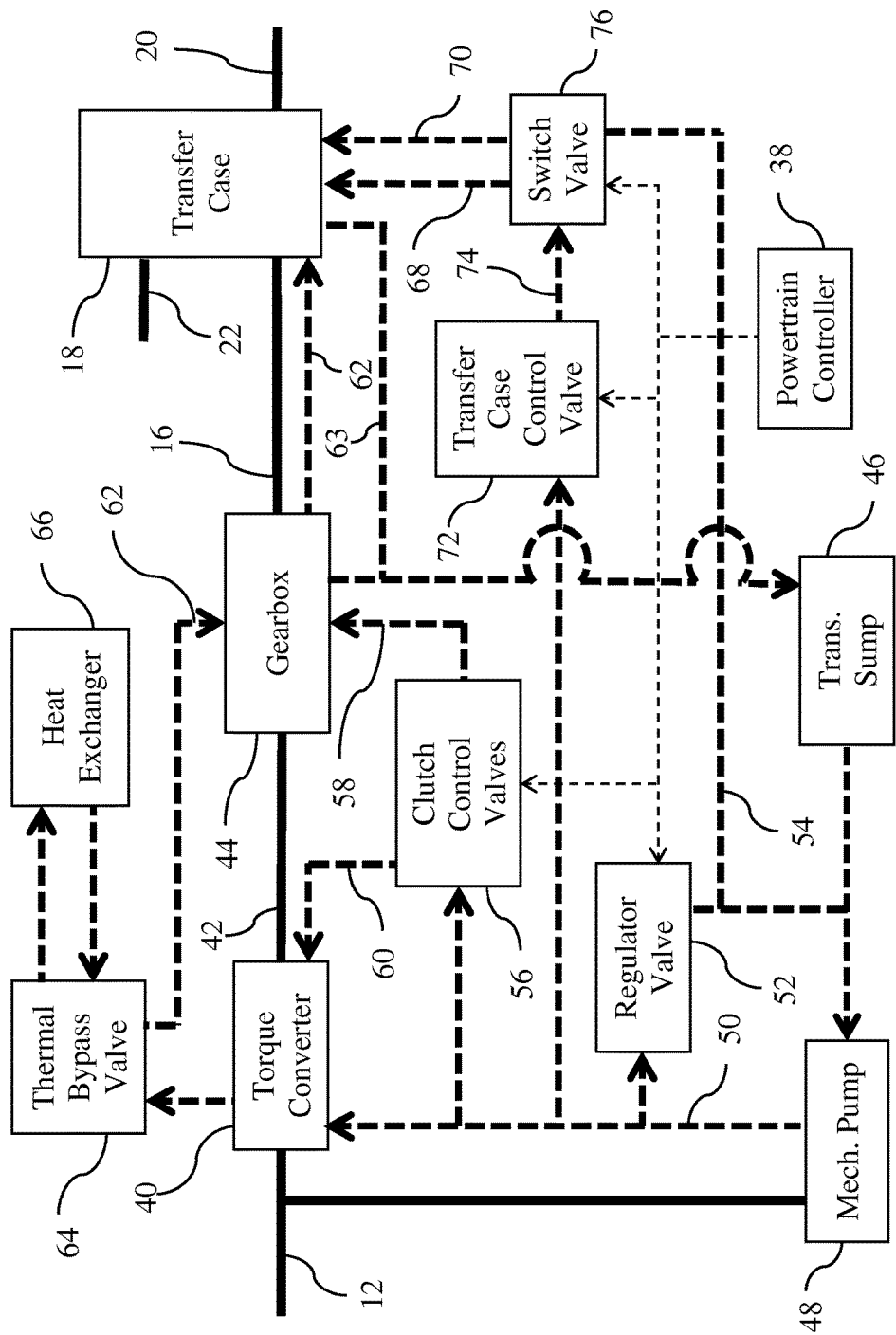
FIG. 2 is a schematic diagram of a transmission hydraulic control system suitable for use in the powertrain of FIG. 1.

FIG. 2 schematically illustrates an integrated transmission and transfer case hydraulic control system. The flow of mechanical power is indicated by heavy solid lines. Flow of hydraulic fluid is shown by medium dashed lines. Narrow dashed lines indicate the flow of electrical signals. The engine crankshaft 12 drives a torque converter 40. Torque converter 40 drives turbine shaft 42 which provides power to gearbox 44. Gearbox 44, in turn, drives transmission output shaft 16. Torque converter 40 includes an impeller fixed to transmission input shaft 12, a turbine fixed to turbine shaft 42, and a stator. The torque applied to turbine shaft 42 and the resistance torque applied to transmission input shaft 12 both depend upon the relative speeds of the two shafts. The torque converter may also include a bypass clutch that couples the transmission input shaft to the turbine shaft providing more efficient power transfer.

Gearbox 44 may include gears and clutches configured to establish a variety of power flow paths between turbine shaft 42 and transmission output shaft 16. The different power flow paths establish different speed ratios. Which power flow path is established depends upon which clutches are engaged. The set of clutches in gearbox 44 may include hydraulically actuated friction clutches. A hydraulically actuated friction clutch is engaged by supplying pressurized fluid to a piston apply chamber. The torque capacity of the clutch is linearly related to the fluid pressure. When the pressure is reduced, the clutch releases.

Transmission sump 46, typically located at the lowest point of the transmission, contains a supply of transmission fluid at ambient pressure. Pump 48 draws fluid from sump 46 and delivers it to line pressure circuit 50 at elevated pressure. Pump 48 may be a positive displacement pump that transfers a fixed quantity of fluid per revolution of the transmission input shaft 12. In some embodiments, the pump displacement may be fixed while in other embodiments the displacement may vary in response to commands from the controller. Regulator valve 52 controls the pressure of line pressure circuit 50 by exhausting a fraction of the flow from pump 48 to exhaust circuit 54 which circulates the fluid back to the pump inlet. The regulator valve accomplishes this by adjusting the size of a valve opening leading to the exhaust circuit such that the pressure in the line pressure circuit matches a commanded line pressure from powertrain controller 38. A set of clutch control valves 56 establish pressures between the line pressure and ambient pressure in a number of clutch apply circuits 58 and a bypass clutch apply circuit 60 according to commands from powertrain controller 38. There is one clutch apply circuit for each hydraulically actuated friction clutch in gearbox 44. In some embodiments, there may be one clutch control valve for each clutch apply circuit. In other embodiments, a network of hydraulic switches may direct flow from a smaller number of clutch control valves to particular clutch apply circuits while directing either line pressure or exhaust pressure to the others. Some embodiments may include a manual valve that is mechanically linked to a gear selector and which may inhibit the supply of line pressure to certain clutch apply circuits depending on the position of gear selector to avoid possible error states. For example, when the gear selector is in reverse, the manual valve may preclude applying clutches that would result in forward transmission output torque.

Pump 48 also supplies fluid to fill torque converter 40 and to lubricate gearbox components. When the fluid is cool, fluid exiting torque converter 40 is routed into lube circuit 62 by thermal bypass valve 64. In addition to providing lubrication, this fluid absorbs heat that is generated by friction between transmission gears and heat that is dissipated by slipping friction clutches. After flowing past gearbox components, the fluid drains back to sump 46. The lube circuit 62 extends from the gearbox into the transfer case. After flowing past transfer case components, the fluid drains back into transmission sump 46 via a drainback passageway 63. Since the fluid absorbs heat from many processes in the transmission and transfer case, it gradually gets warm. When a predetermined temperature is reached, thermal bypass valve 64 diverts the flow exiting the torque converter through a heat exchanger 66 before routing the fluid to lube circuit 62.

The state of the transfer case is controlled by adjusting the pressures of high range circuit 68 and low range circuit 70. Transfer case control valve 72 adjust the pressure in controlled pressure circuit 74 to a value less than line pressure and proportional to an electrical current from powertrain controller 38. When an electrical current from powertrain controller 38 is present, switch valve 76 directs the controlled pressure 74 to the high range circuit 68 and vents the low range circuit 70 to the exhaust circuit 54. When the electrical current is not present, switch valve 76 reverses these connections, directing the controlled pressure 74 to the low range circuit 70 and venting the high range circuit 68. Transfer case control valve 72 and switch valve 76 are physically part of the transmission valve body. Therefore, the hydraulic connections between the transmission and the transfer case include i) lube circuit 62, ii) fluid drainback passageway 63, iii) the high range circuit 68, and iv) the low range circuit 70.

Figure 3:
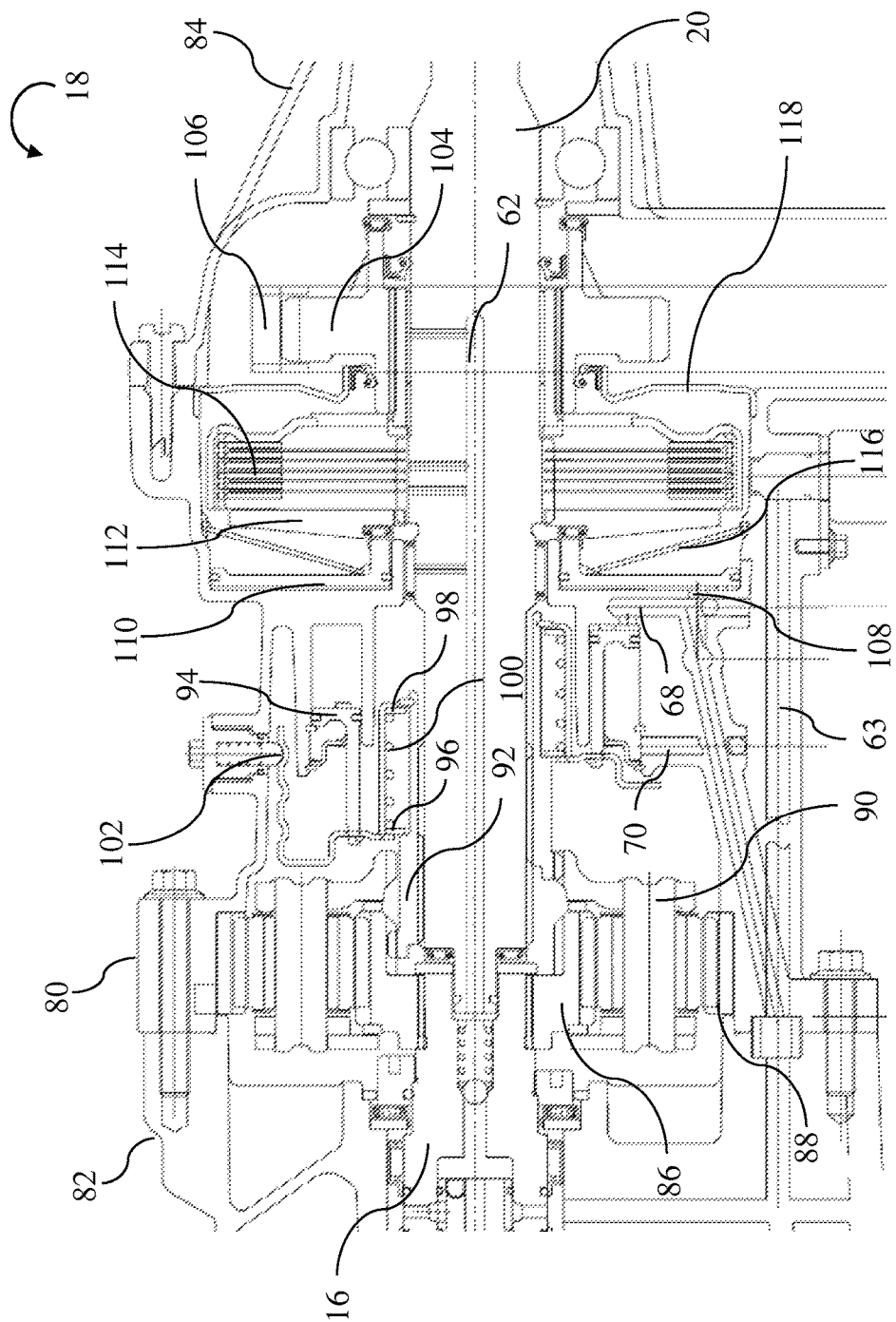
FIG. 3 is a partial cross section of a transfer case suitable for use in the powertrain of FIG. 1.

A cross section of transfer case 18 is shown in FIG. 3. The transfer case includes a front housing 80 bolted to the transmission housing 82 and a rear housing 84 bolted to the front housing 80. The transmission output shaft 16 extends into the transfer case front housing. Rear driveshaft 20 is supported by the rear housing 84 via ball bearings and by the front housing 80 via roller bearings. Rear driveshaft 20 interfaces with transmission output shaft 16 such that lube circuit 62 flows from transmission output shaft 16 into rear driveshaft 20. Sun gear 86 is splined to transmission output shaft 16. Ring gear 88 is splined to front housing 80. Carrier 90 is supported for rotation about the rear driveshaft. A number of planet gears are supported for rotation with respect to carrier 90 and mesh with both sun gear 86 and with ring gear 88. The speed of carrier 90 is a fixed fraction of the speed of transmission output shaft 16 based on the relative number of teeth on sun gear 86 and ring gear 88.

The top half of FIG. 3 is drawn with components positioned as they would be with high range selected while the bottom half corresponds to low range. Dog 92 rotates with rear driveshaft 20 but slides axially. When dog 92 is in its most forward position, as shown on the top half of FIG. 3, it engages with sun gear 86 causing the rear driveshaft to rotate at the same speed as transmission output shaft 16. When dog 92 is in its most rearward position, as shown on the bottom half of FIG. 3, it engages with carrier 90 causing the rear driveshaft to rotate slower than transmission output shaft 16. High range is engaged by supplying pressurized fluid through high range circuit 68 to the rear side of piston 94 pushing it forward. Rings 96 and 98 are separated by spring 100 and constrain the relative position of piston 94 and dog 92. When piston 94 moves forward, it pushes ring 98 forward compressing spring 100. Spring 100 exerts forward force on ring 96 which exerts forward force on dog 92. If the teeth on dog 92 are lined up with gaps between corresponding teeth on sun gear 86, dog 92 immediately slides into the position shown on the top half of FIG. 3 and high range is engaged. If the teeth are not properly aligned for engagement, the force is sustained until slight relative movement between the shafts allows engagement and then engagement occurs. Once piston 94 is in the position corresponding to high range, detent 102 holds it in that position. Similarly, low range is engaged by supplying pressurized fluid through low range circuit 70 to the front side of piston 94 pushing it rearward. When piston 94 moves rearward, it pushes ring 96 rearward compressing spring 100. Spring 100 exerts rearward force on ring 98 which exerts rearward force on dog 92. When the teeth on dog 92 are lined up with gaps between corresponding teeth on carrier 90, dog 92 slides into the position shown on the bottom half of FIG. 3 and low range is engaged. Once piston 94 is in the position corresponding to low range, detent 102 holds it in that position. Detent 102 also holds piston 94 in a middle position causing dog 92 to disengage from both sun gear 86 and carrier 90. In this position, no speed relationship is imposed between rear driveshaft 20 and transmission output shaft 16.

Sprocket 104 is supported for rotation about rear driveshaft 20. Chain 106 engages sprocket 104 and a corresponding sprocket fixed to front driveshaft 22. When controller 38 senses or anticipated wheel slip, it routes hydraulic fluid to clutch apply circuit 108. The fluid pressure pushes piston 110 rearward. Acting through bearings, piston 110, which does not rotate, pushes pressure plate 112, which rotates with rear driveshaft 20. Clutch pack 114 includes friction plates splined with sprocket 104 interleaved with separator plates splined with rear driveshaft 20. When pressure plate 112 compressed clutch pack 114, friction causes the speeds of rear driveshaft 20 and sprocket 104 to equalize. This has the effect of transferring torque from wheels that have lost traction to wheels that retain traction. When the pressure in clutch apply circuit 108 is removed, return spring 116 pushes piston 110 forward. In an alternative embodiment, piston 110 could rotate and slide within a rotating housing. In that case, fluid at low pressure from lube circuit 62 could be routed to the opposite side of piston 110 to cancel the effects of centrifugal forces. This type of clutch is known as a torque on demand (TOD) clutch. In other types of transfer cases, the front and rear driveshafts 22 and 20 may be driven via a center differential that divides the torque while allowing some speed differences. Such transfer cases may include a torque on demand clutch that locks the center differential in response to loss of traction on either front or rear wheels in order to provide all of the torque to the wheels with traction.

Plate 118 separates the transfer case cavity into a front cavity and a rear cavity. Seals prevent the flow of fluid between these cavities. The rear cavity contains a quantity of fluid that provides lubrication to the chain and sprockets. This fluid is distributed by splashing. Components in the front cavity are lubricated by fluid from lube circuit 62. This fluid never enters the rear cavity. After lubricating the components, the fluid from lube circuit 62 drains by gravity to the bottom of the front housing and from there drains back to the transmission via fluid drainback passageway 63.

Figure 4:
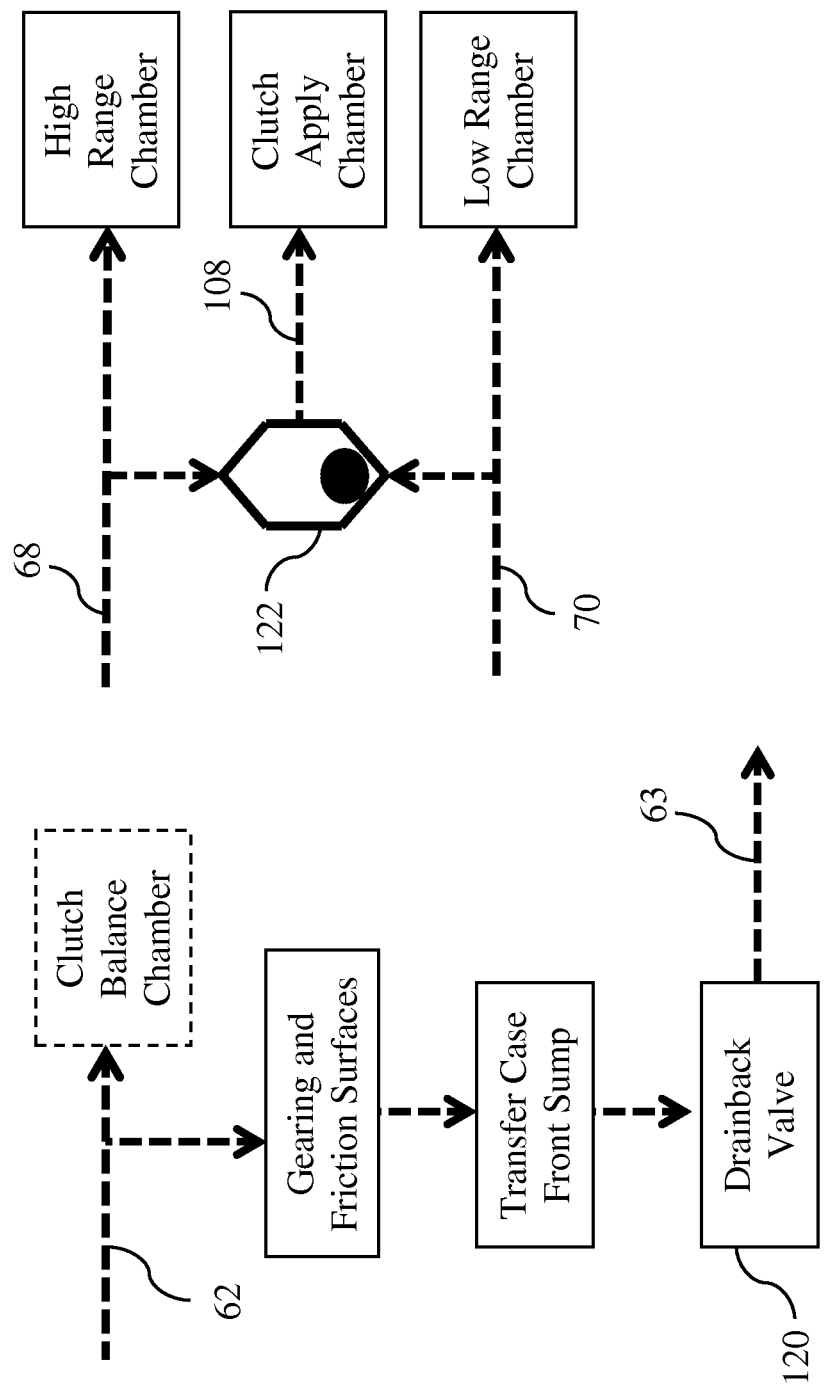
FIG. 4 is a schematic diagram of a hydraulic control system suitable for use in the transfer case of FIG. 3.

FIG. 4 illustrates the portions of the hydraulic network within the transfer case. The circuits associated with lubrication are shown on the left. Lube circuit 62 flows into the transfer case and then flows past the gearing and the friction surfaces to the transfer case front sump. If the torque on demand clutch is a rotating clutch with a balance chamber, the lube circuit would also be routed to the balance chamber. From the front sump, the fluid drains back by gravity to the transmission sump through drainback passageway 63. Some embodiments may include a drainback valve 120 configured to block the drainback passageway in preparation for vehicle towing as described below. The drainback valve may be part of the transmission or may be part of the transfer case.

The circuits associated with control of range selection and actuation of the torque on demand clutch are shown on the right. High range circuit 68 flows into the high range chamber and low range circuit flows into the low range chamber 70. Check ball 122 routes flow from either the high range circuit 68 or the low range circuit 70 to the clutch apply circuit 108. Specifically, when high range circuit 68 is at a higher pressure than the low range circuit 70, the ball moves to the position shown, blocking flow from the low range circuit 70 and allowing fluid from high range circuit 68 to flow into the clutch apply circuit 108. When the low range circuit 70 is at higher pressure, the ball moves to the other end and the low range circuit is connected to the clutch apply circuit 108.

Figure 5:
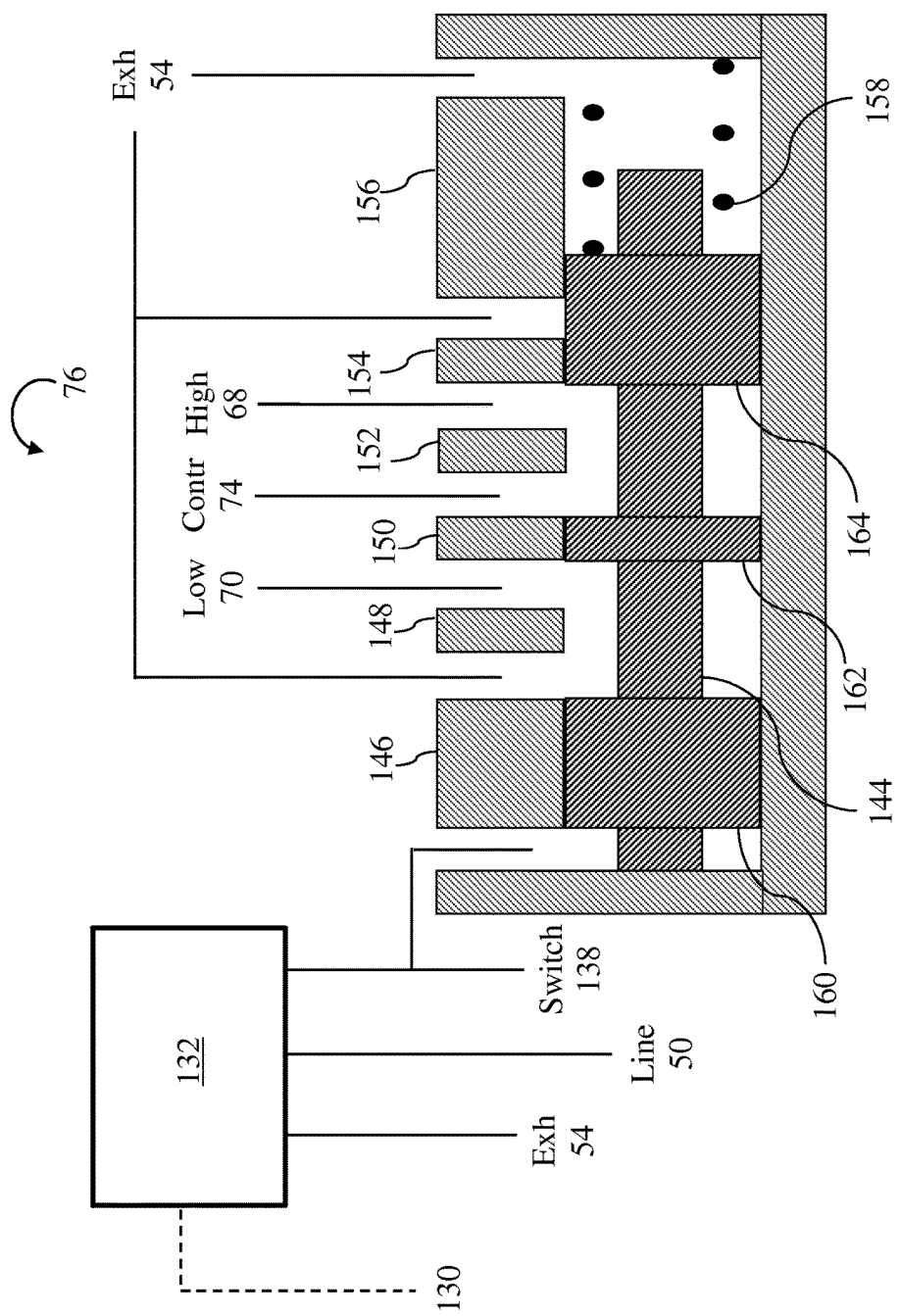
FIG. 5 is a schematic diagram of a switch valve, shown in a high range position, suitable for use in the hydraulic control system of FIG. 2.

FIG. 5 shows switch valve 76 in the state corresponding to high range. Controller 38 adjusts the switch valve state by commanding an electrical current 130 to a solenoid valve 132. Solenoid valve 132 is connected to the line pressure circuit 50 and the exhaust circuit 54 and controls the pressure in switch circuit 138 to a pressure less than line pressure in response to the electrical signal 130. Solenoid valve 132 may be, for example, a Mini Direct Acting (MDA) solenoid valve. To place the switch valve 76 in the position shown in FIG. 5, the controller adjust the current such that the pressure in switch circuit 138 is relatively low. A spool 144 moves within a bore. Bore lands 146, 148, 150, 152, 154, and 156 define first through seventh ports. The first port is connected to the switch circuit; the second, sixth, and seventh ports are vented to exhaust circuit 54; the third port is connected to low range circuit 70; the fourth port is connected to controlled pressure circuit 74; and the fifth port is connected to high range circuit 68. In the high range state shown in FIG. 5, since the pressure in switch circuit 138 is relatively low, return spring 158 pushes the second spool to the left. In this position, the low range circuit 70 is connected to the exhaust circuit 54 between first spool land 160 and second spool land 162 and the high range circuit is connected to the controlled pressure circuit 74 between second spool land 162 and third spool land 164.

Figure 6:
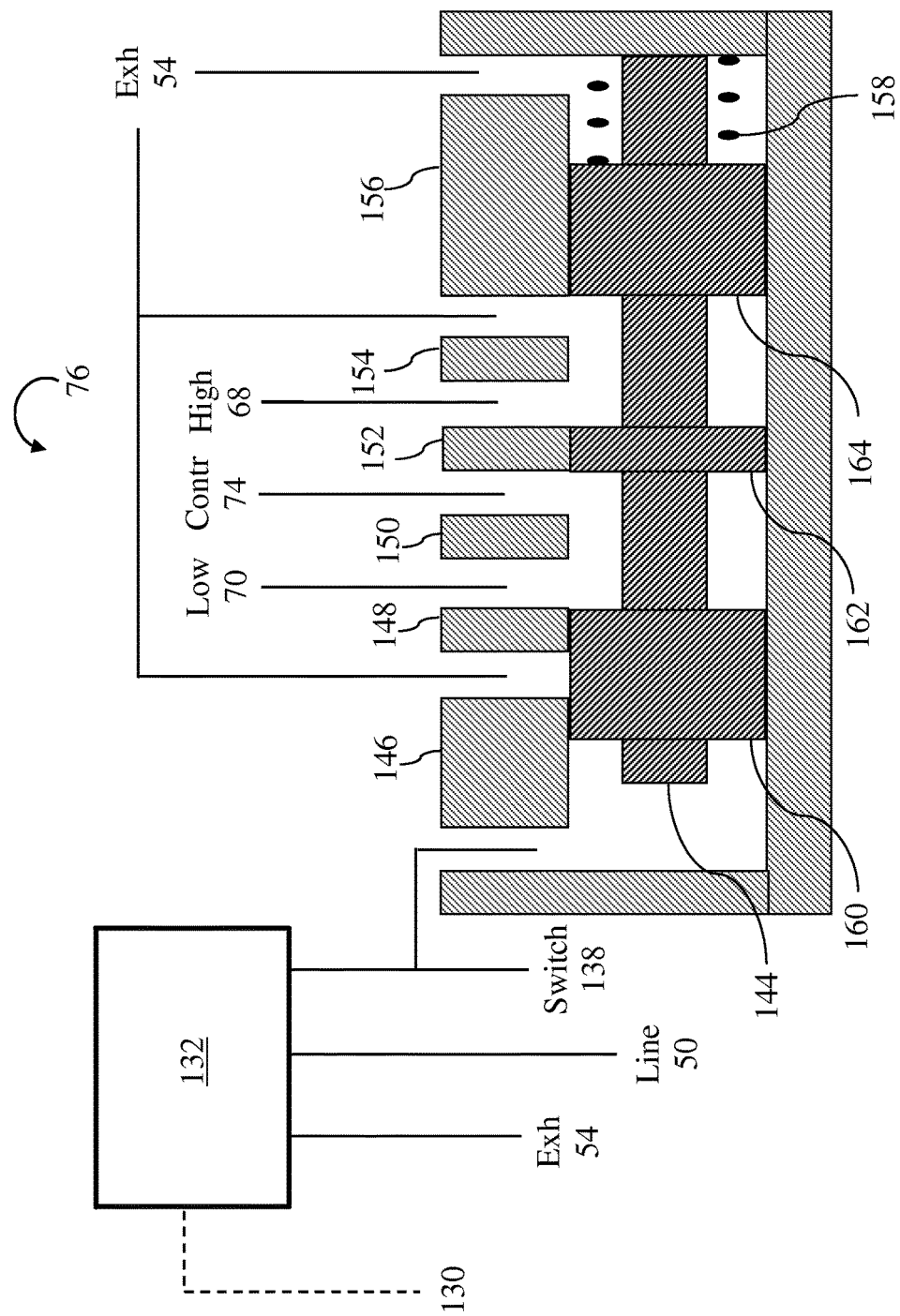
FIG. 6 is a schematic diagram of the switch valve of FIG. 5, shown in a low range position.

FIG. 6 shows switch valve 76 in the state corresponding to low range. Controller 38 places the switch valve into this state by setting the electrical current 130 to solenoid valve 132 such that the pressure in switch circuit 138 is relatively high. The relatively high switch pressure 138 pushes the spool to the right, compressing return spring 158. In this position, the low range circuit 70 is connected to the controlled pressure circuit 74 between first spool land 160 and second spool land 162 and the high range circuit is connected to the exhaust circuit 54 between second spool land 162 and third spool land 164.

Figure 7:
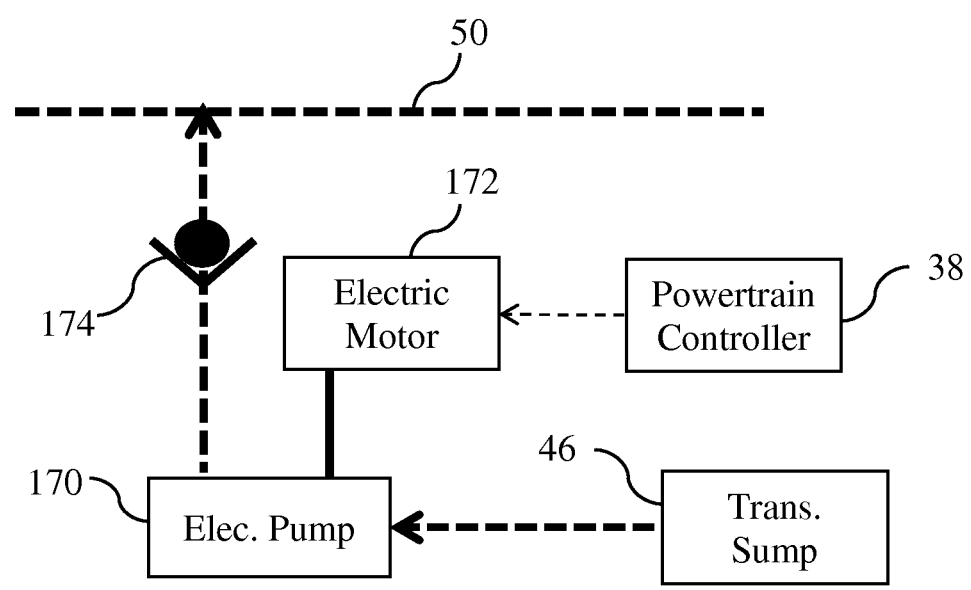
FIG. 7 is a schematic diagram of a supplemental pump system suitable for use in conjunction with the hydraulic control system of FIG. 2.

FIG. 7 illustrates a supplemental electric pump system that may be incorporated with the transmission hydraulic control system of FIG. 2. In some embodiments, the components of the supplemental electric pump system may be physically integrated with the transfer case control valve 72 and switch valve 76 in a supplemental valve body. The supplemental valve body may be included only in transmissions that will be mated to a transfer case. The supplemental electric pump system includes a second pump 170 driven by an electric motor 172. Electric motor 172 rotates in response to commands from powertrain controller 38. For example, powertrain controller 38 may command electric pump to rotate when pressurized fluid is needed and engine 10 is not on. The second pump 170, like the primary pump 48, may be a positive displacement pump of either fixed or variable displacement. Pump 170 draws fluid from the transmission sump 46 and provides the fluid to line pressure circuit 50. From line pressure circuit 50, the fluid may be routed to other circuits as required. Check ball 174 prevents fluid from the line pressure circuit from back-feeding the electric pump 170 when the electric pump is not in operation.

When a vehicle with the powertrain of FIG. 1 is towed with the rear wheels 28 and 30 on the ground, rotation of the rear wheels causes the rear driveshaft 20 to rotate. If front wheels 34 and 36 are also on the ground, front driveshaft 22 also rotates. Whenever parts rotate, it is important that the parts have proper lubrication to avoid excessive wear. Rear differential 26 and front differential 32 are filled with fluid which is distributed to the moving parts by splashing. Similarly, components in the rear portion of transfer case 18 are lubricated by splashed fluid from the rear transfer case sump. However, under normal circumstances, the components in transmission 12 and the front portion of transfer case 18 rely upon fluid pumped through lube circuit 62 for lubrication. Mechanical pump 48 only operates when the engine is running. Operating the engine during towing uses fuel and causes additional wear on the engine. Optional electric pump 170 can provide fluid to the lubrication circuit as long as battery power is available. However, with the engine off, the battery may become discharged.

Figure 8:
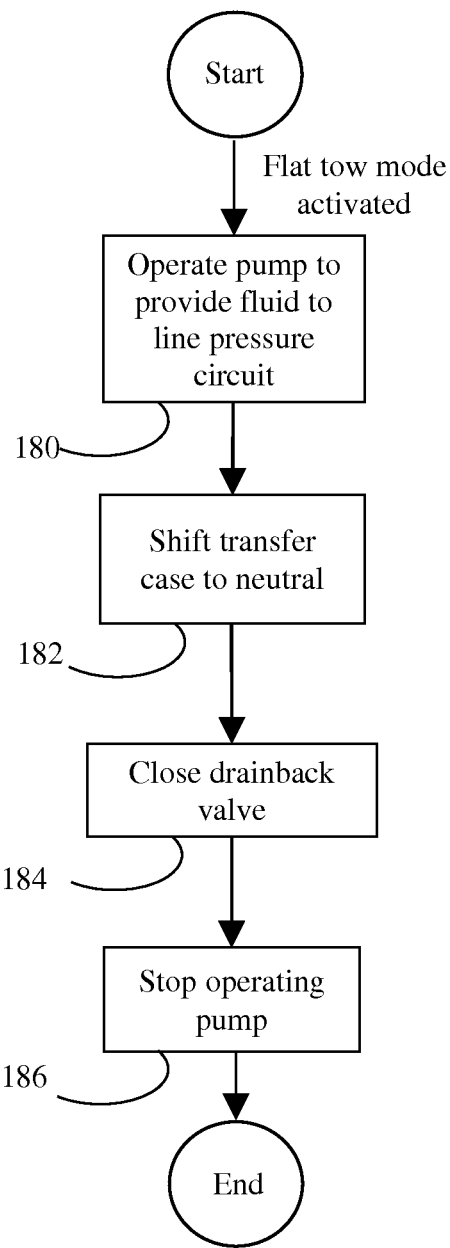
FIG. 8 is a flow chart illustrating a method of preparing the powertrain of FIG. 1 for towing to ensure proper lubrication.

FIG. 8 illustrates a method of preparing a vehicle for towing. The method is initiated in response to a flat tow mode being activated. The flat tow mode may be activated, for example, by selecting a corresponding position with a range selection knob or by moving a shift selector through a sequence that is not likely to occur during normal driving. At 180, a pump is operated to provide pressurized fluid to line pressure circuit 50 and to provide flow through lube circuit 62. For a vehicle equipped with electric pump 170, this may be accomplished by commanding electric motor 172 to rotate. Alternatively, this may be accomplished by running engine 10 to drive mechanical pump 48. At 182, the transfer case is shifted to neutral. If the transfer case is in high range, it is shifted into neutral by commanding switch valve 76 to the low range position of FIG. 6 and then commanding transfer case control valve 72 to generate pressure in circuits 74 and 70 for long enough to move piston 94 to the middle detent, but not long enough to move it all of the way to the low range position. Similarly, if the transfer case is in low range, it is shifted to neutral by commanding switch valve 76 to the high range position of FIG. 5 and then commanding transfer case control valve 72 to generate pressure for an appropriate interval. Once the transfer case is in neutral, rotation of rear driveshaft 20 does not result in rotation of transmission output shaft 16. Therefore, there is no longer any need to provide lubrication to components in the transmission during towing.

At 184, drainback valve 120 is commanded to the closed position. Once drainback valve 120 is closed, fluid flowing into the front portion of the transfer case via lube circuit 62 accumulates in the transfer case front sump. Once a sufficient amount of fluid has accumulated, operation of the pump stops at 186 to avoid over-filling and the method is completed. During towing, components in the front portion of the transfer case will be lubricated by splashing fluid from the transfer case front sump.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission hydraulic control system comprising:
   a high range circuit and a low range circuit each adapted to transmit fluid across an interface to a transfer case;
   a pressure control valve configured to adjust a pressure in a controlled pressure circuit based on a first current; and
   a switch valve configured to fluidly connect the controlled pressure circuit to the high range circuit and to the low range circuit, alternately, based on a second current.

2. The hydraulic control system of claim 1 further comprising a controller programmed to adjust the first and second currents to:
   momentarily increase a pressure in the high range circuit in response to a high range selection command; and
   momentarily increase a pressure in the low range circuit in response to a low range selection command.

3. The hydraulic control system of claim 2 wherein the controller is further programmed to adjust the first current to increase the pressure in the controlled pressure circuit in response to an indication of vehicle rear wheel slip.

4. The hydraulic control system of claim 1 further comprising:
   a mechanically driven pump configured to draw fluid from a transmission sump and provide the fluid at elevated pressure to a line pressure circuit; and
   a regulator valve configured to adjust the pressure of the line pressure circuit based on a third current.

5. The hydraulic control system of claim 4 further comprising:
   a lube circuit adapted to transmit fluid to the transfer case; and
   a drainback passageway adapted to transmit fluid from a transfer case sump to the transmission sump.

6. The hydraulic control system of claim 5 wherein the lube circuit transmits fluid to the transfer case through a transmission output shaft.

7. The hydraulic control system of claim 5 further comprising a drainback valve configured to selectively block the drainback passageway.

8. The hydraulic control system of claim 4 further comprising an electrically driven pump configured to draw fluid from the transmission sump and provide the fluid at elevated pressure to the line pressure circuit.

9. The hydraulic control system of claim 7 further comprising a controller programmed to prepare a vehicle to be towed by:
   closing the drainback valve;
   while the drainback valve is closed, operating the pump to transfer fluid from the transmission sump to the transfer case sump; and
   shifting a coupler to disengage a rear driveshaft from a transmission output shaft.

10. The method of claim 9 wherein operating the pump to transfer fluid comprises operating an engine to drive the pump.

11. The method of claim 9 wherein operating the pump to transfer fluid comprises operating an electric motor to drive the pump.

* * * * *